United States Patent [19]

Mardis et al.

[11] Patent Number: 4,517,112

[45] Date of Patent: May 14, 1985

[54] MODIFIED ORGANOPHILIC CLAY COMPLEXES, THEIR PREPARATION AND NON-AQUEOUS SYSTEMS CONTAINING THEM

[75] Inventors: Wilbur S. Mardis, Trenton, N.J.; Claude M. Finlayson, Houston, Tex.

[73] Assignee: NL Industries, Inc., New York, N.Y.

[21] Appl. No.: 348,641

[22] Filed: Feb. 18, 1982

[51] Int. Cl.³ .............................................. B01J 13/00
[52] U.S. Cl. .................................. 252/315.2; 106/27; 106/38.7; 106/287.17; 252/8.5 M; 252/8.55 R; 252/28; 252/309; 252/DIG. 8; 260/448 C; 524/236
[58] Field of Search ............... 252/315.2, 8.5 M, 309, 252/28; 260/448 C

[56] References Cited

U.S. PATENT DOCUMENTS

| | | | |
|---|---|---|---|
| 2,033,856 | 3/1936 | Smith | 546/10 |
| 2,531,427 | 11/1950 | Hauser | 252/315.2 X |
| 2,531,440 | 11/1950 | Jordan | 252/28 |
| 2,548,679 | 4/1951 | Olin | 564/285 |
| 2,658,869 | 11/1953 | Stross et al. | 252/28 |
| 2,739,067 | 3/1956 | Ratcliffe | 106/30 |
| 2,750,296 | 6/1956 | Curado et al. | 106/30 |
| 2,754,219 | 7/1956 | Voet et al. | 106/32 |
| 2,767,177 | 10/1956 | Erickson | 260/242 |
| 2,859,234 | 11/1958 | Clem | 252/49.7 X |
| 2,885,360 | 5/1959 | Haden, Jr. et al. | 252/28 |
| 3,461,163 | 8/1969 | Boothe | 564/296 |
| 3,472,740 | 10/1969 | Boothe | 203/37 |
| 3,537,994 | 11/1970 | House | 252/13 |
| 3,929,849 | 12/1975 | Oswald | 260/448 C |
| 3,945,836 | 3/1976 | Miyata | 106/22 |
| 3,974,125 | 8/1976 | Oswald et al. | 523/216 |
| 4,054,537 | 10/1977 | Wright et al. | 423/331 X |
| 4,097,437 | 6/1978 | Dhake | 524/236 |
| 4,105,578 | 8/1978 | Finlayson et al. | 252/315.2 |
| 4,116,866 | 9/1978 | Finlayson | 252/315.2 |
| 4,208,218 | 6/1980 | Finlayson | 252/315.2 X |
| 4,216,135 | 8/1980 | Finlayson | 252/315.2 X |
| 4,317,737 | 3/1982 | Oswald et al. | 252/28 |

FOREIGN PATENT DOCUMENTS

| | | | |
|---|---|---|---|
| 1106281 | 3/1968 | United Kingdom | 252/315.2 |
| 1592271 | 7/1981 | United Kingdom . | |

*Primary Examiner*—Richard D. Lovering
*Attorney, Agent, or Firm*—Burns, Doane, Swecker & Mathis

[57] ABSTRACT

An organophilic clay gellant useful for gelling organic liquids is disclosed which comprises the reaction product of (a) a smectite-type clay having a cation exchange capacity of at least 75 milliequivalents per 100 grams of said clay; (b) a primary anion selected from the group consisting of anions derived from organic sulfonic acids, alkylsulfates and mixtures thereof containing at least one lineal or branched alkyl group having greater than 9 carbon atoms, aromatic sulfonic acids and mixtures thereof; (c) a secondary anion different from said primary anion and selected from the group consisting of anions derived from organic acids having a pKa of less than about 11.0 and mixtures thereof; and (d) an organic cation is an amount sufficient to satisfy the cation in exchange capacity of said clay and the cationic activity of the primary and secondary anions wherein the resulting organic cation-organic anion complexes are intercalated with the smectite-type clay and wherein the combination of said primary and secondary anion synergistically increases the ease of dispersion of said organophilic clay gellant in an organic liquid.

24 Claims, No Drawings

MODIFIED ORGANOPHILIC CLAY COMPLEXES, THEIR PREPARATION AND NON-AQUEOUS SYSTEMS CONTAINING THEM

This invention relates to organophilic organic-clay complexes which are dispersible in organic liquids to form a gel therein. Depending on the composition of the gel, such gels may be useful as lubricating greases, oil base muds, oil base packer fluids, paint-varnish-lacquer removers, paints, foundry molding sand binders, adhesives and sealants, inks, polyester laminating resins, polyester gel coats, and the like.

It is well known that the organic compounds which contain a cation will react under favorable conditions by ion-exchange with clays which contain a negative layer-lattice and exchangeable cations to form organophilic organic-clay products. If the organic cation contains at least one alkyl group containing at least 10 carbon atoms, then such organoclays have the property of swelling in certain organic liquids. See for Example U.S. Pat. No. 2,531,427 and U.S. Pat. No. 2,966,506, both incorporated herein by reference, and the book "Clay Mineralogy", 2nd Edition, 1968 by Ralph E. Grim (McGraw Hill Book Co., Inc.), particularly Chapter 10, *Clay-Mineral-Organic Reactions;* pp. 356–368 - Ionic Reactions, Smectite; and pp. 392–401 - Organophilic Clay-Mineral Complexes.

It is also known that organic compounds presented in the anionic form are usually repelled by, rather than attracted to, the negatively charged clay surface. This effect is referred to as negative adsorption. However, positive adsorption of anions can occur under conditions gel coats, and the like.

It is well known that the organic compounds which contain a cation will react under favorable conditions by ion-exchange with clays which contain a negative layerlattice and exchangeable cations to form organophilic organic-clay products. If the organic cation contains at least one alkyl group consisting at least 10 carbon atoms, then such organoclays have the property of swelling in certain organic liquids. See for Example U.S. Pat. No. 2,531,427 and U.S. Pat. No. 2,966,506, both incorporated herein by reference, and the book "Clay Mineralogy", 2nd Edition, 1968 by Ralph E. Grim (McGraw Hill Book Co., Inc.), particularly Chapter 10, *Clay-Mineral-Organic Reactions;* pp. 356–368 - Ionic Reaction, Smectite; and pp. 392–401 - Organophilic Clay-Mineral Complexes.

It is also known that organic compounds presented in the anionic form are usually repelled by, rather than attracted to, the negatively charged clay surface. This effect is referred to as negative adsorption. However, positive adsorption of anions can occur under conditions in which such compounds exist in the molecular, i.e. undissociated form. See "Chemistry of Clay—Organic Reactions" 1974 by B. K. G. Theng, John Wiley & Sons.

In contrast, Wada found that this phenomena, i.e. adsorption, does occur with certain ionic compounds when reacted with halloysite, kaolinite group material, to form intersalates. Intersalation was achieved by grinding the mineral with moist crystals of salts of low molecular weight carboxylic acids or by contacting the mineral with saturated solutions. This interlayer complex contained the complete salt as well as water. The intersalated material however was removed by washing with water resulting in either hydration of the interlayer or collapse to the original spacing. No evidence of variation in basal spacing was found with montmorillonite treated with salts in contrast with halloysite. See *The American Minerologist*, Volume 44, 1959, by K. Wada "Oriented Penetration of Ionic Compounds between the Silicate Layers of Halloysite".

Since the commercial introduction of organo-clays in the early 1950's, it has become well known that maximum gelling (thickening) efficiency from these organo-clays is achieved by adding a low molecular weight polar organic material to the composition. Such polar organic materials have been variously called dispersants, dispersion aids, solvating agents, dispersion agents and the like. See for example the following U.S. Pat. Nos.: O'Halloran 2,677,661; McCarthy et al 2,704,276; Stratton 2,833,720; Stratton 2,879,229; Stansfield et al. 3,294,683. The use of such dispersion aids was found unnecessary when using specially designed organophilic clays derived from substituted quaternary ammonium compounds. See U.S. Pat. Nos.: Finlayson et al. 4,105,578 and Finlayson 4,208,218.

In contrast to the prior art organo-clay compositions, a self-activating rheological agent has been unexpectedly produced which does not require the addition of polar solvent activators, which agent is produced from the reaction of an organic cation, mixture of organic anions and smectite-type clay.

An organophilic clay gellant having enhanced dispersibility in non-aqueous systems and process for making and using the same has been unexpectedly discovered which comprises the reaction product of an organic cation, a primary and secondary organic anion and a smectite-type clay having a cation exchange capacity of at least 75 milliequivalents per 100 grams of said clay such that organic cation—organic anion complexes which are present are intercalated with the smectite-type clay and the cation exchange sites of the smectite-type clay are substituted with the organic cation, and wherein the amount of organic cation present in at least $(100+n)$ milliquivalents, where n is the amount of primary anion expressed in milliequivalents per 100 grams of clay, 100% active clay basis.

The clays used to prepare the organophilic clay gellants of this invention are smectite-type clays which have a cation exchange capacity of at least 75 milliequivalents per 100 grams of clay. Particularly desirable types of clay are the naturally-occurring Wyoming varieties of swelling bentonites and like clays and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like, followed by shearing the mixture with a pugmill or extruder.

Smectite-type clays prepared naturally or synthetically by either a pneumatolytic or, preferably a hydrothermal synthesis process can also be used to prepare the present organophilic clays. Representative of such clays are montmorillonite, bentonite, beidellite, hectorite, saponite, and stevensite. These clays may be synthesized hydrothermally by forming an aqueous reaction mixture in the form of a slurry containing mixed hydrous oxides or hydroxides of the desired metal with or without, as the case may be, sodium (or alternate exchangeable cation or mixtures thereof) fluoride in the proportions for the particular synthetic smectite desired. The slurry is then placed in an autoclave and heated under autogenous pressure to a temperature within the range of approximately 100° to 325° C., preferably 274° to 300° C., for a sufficient period of time to form the desired product.

The cation exchange capacity of the smectite-type clays can be determined by the well-known ammonium acetate method.

The organic cationic compounds which are useful in this invention may be selected from a wide range of materials that are capable of forming an organophilic clay by exchange of cations with the smectite-type clay. The organic cationic compound must have a positive charge localized on a single atom or on a small group of atoms within the compound. Preferably the organic cation is selected from the group consisting of quaternary ammonium salts, phosphonium salts, sulfonium salts and mixtures thereof wherein the organic cation contains at least one lineal or branched alkyl group having 8 to 22 carbon atoms. The remaining moieties on the central positively charged atoms are chosen from (a) lineal or branched alkyl groups having 1 to 22 carbon atoms; (b) aralkyl groups, that is benzyl and substituted benzyl moieties including fused ring moieties having lineal or branched 1 22 carbon atoms in the alkyl portion of the structure; (c) aryl groups such as phenyl and substituted phenyl including fused ring aromatic substituents; and (d) hydrogen.

The lineal or branched alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefines. Addition exemplary radicals incude methyl, ethyl, decyl, lauryl, stearyl.

Additional examples of aralkyl, that is benzyl and substituted benzyl moieties would include those materials derived from, e.g. benzyl halides, benzyhydryl halides, trityl halides, α-halo-α-phenylalkanes wherein the alkyl chain has from 1 to 22 carbon atoms such as 1-halo-1-phenylethane, 1-halo-1-phenylpropane, and 1-halo-1-phenyloctadecane; substituted benzyl moieties such as would be derived from ortho-, meta-, and para-chlorobenzyl halides, para-methoxybenzyl halides, ortho-, meta- and para-nitrilobenzyl halides, and ortho-, meta-, and para-alkylbenzyl halides wherein the alkyl chain contains from 1 to 22 carbon atoms; and fused ring benzyl-type moieties such as would be derived from 2-halomethylnaphthalene, 9-halomethylanthracene and 9-halomethylphenanthrene, wherein the halo group would be defined as chloro-, bromo-, iodo-, or any other such group which serves as a leaving group in the nucleophilic attack of the benzyl type moiety such that the nucleophile replaces the leaving group on the benzyl type moiety.

Examples of aryl groups would include phenyl such as N-alkyl-and N,N-dialkylanilines, wherein the alkyl groups contain between 1 to 22 carbon atoms; ortho-, meta-, and para-nitrophenyl; ortho-, meta- and para-alkylphenyl, wherein the alkyl group contains between 1 and 22 carbon atoms; 2-, 3-, and 4-halophenyl wherein the halo group is defined as chloro-, bromo-, or iodo-; and 2-, 3-, and 4-carboxyphenyl and esters thereof, where the alcohol of the ester is derived from an alkyl alcohol, wherein the alkyl group contains between 1 and 22 carbon atoms, aryl such as phenol, or aralkyl such as benzyl alcohols; fused ring aryl moieties such as naphthalene, anthracene, and phenanthrene.

Many processes are known to prepare organic cationic salts. For example when preparing a quaternary ammonium salt one skilled in the art would prepare a dialkyl secondary amine, for example, by the hydrogenation of nitriles, see U.S. Pat. No. 2,355,356; form the methyl dialkyl tertiary amine by reductive alkylation using formaldehyde as the source of methyl radical. Also see Shapiro et al. U.S. Pat. No. 3,136,819 for forming the quaternary ammonium halide by adding benzyl chloride or benzyl bromide to the tertiary amine as well as Shapiro et al. U.S. Pat. No. 2,775,617. The salt anion is preferable selected from the group consisting of chloride and bromide, and mixtures thereof, and is more preferably chloride, although other anions such as acetate, hydroxide, nitrite, etc., may be present in the organic cationic compound to neutralize the cation.

These organic cationic compounds can be represented by the formulae:

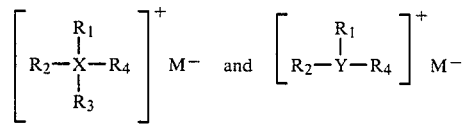

wherein X is nitrogen or phosphorus, Y is sulfur, $M^-$ is selected from the group consisting of chloride, bromide, iodide, nitrite, hydroxide, acetate, methyl sulfate, and mixtures thereof; and wherein $R_1$ is an alkyl group having 8 to 22 carbon atoms; and wherein $R_2$, $R_3$ and $R_4$ are selected from the group consisting of hydrogen; hydroxyalkyl groups; alkyl groups containing 1 to 22 carbon atoms; aryl groups; aralkyl groups containing 1 to 22 carbon atoms on the alkyl chain, and mixtures thereof.

The primary and secondary organic anions useful in this invention may be selected from a wide range of materials providing they are capable of reacting with an organic cation and form intercalations with a smectite-type clay as organic cation-organic anion complexes. The molecular weight (gram molecular weight) of the organic anions is preferably 3,000 or less, and most preferably 1,000 or less and contain at least one acidic moiety per molecule as disclosed herein. Both the primary and secondary anions are preferably derived from an organic acid having a $pK_A$ less than about 11.0. As indicated, the source acid must contain at least one ionizable hydrogen having the preferred $pK_A$ in order to allow the formation of the organic cation-organic anion complexes and subsequent intercalation reaction to occur.

The primary anion of the invention must be an organic sulfur acid. The organic sulfur acid preferably contains at least one lineal or branched alkyl group having greater than 9 carbon atoms and/or an aromatic ring. Representative organic acids may be organic sulfonic acids and alkyl sulfates.

The sulfonic acids included:
(1) benzenesulfonic acids such as benzenesulfonic acid; phenolsulfonic acid; dodecylbenzenesulfonic acid; benzenedisulfonic acid, benzenetrisulfonic acids; para-toluenesulfonic acid; and
(2) alkyl sulfonic acids such as sulfosuccinate alkyl esters such as dioctyl succinylsulfonic acid; and alkyl polyethoxy-succinylsulfonic acid; decanesulfonic acid, dodecanesulfonic acid and octadecanesulfonic acid The alkyl sulfates include such materials as the lauryl half ester of sulfuric acid, the octadecyl half ester of sulfuric acid, the octyl half ester of sulfuric acid. Sodium laurylsulfate is the most preferred material.

The primary and secondary organic anions may be in the acid or salt form. Salts may be selected from alkali metal salts, alkaline earth salts, ammonia, and organic amines. Representative salts include: hydrogen, lithium, sodium, potassium, magnesium, calcium, barium, ammonium and organic amines such as ethanolamine, diethanolamine, triethanolamine, methyl diethanolamine, butyl diethanolamine, diethyl amine dimethyl amine, triethyl amine, dibutyl amine, and so forth, and mixtures thereof. The most preferred salt is sodium as the alkali metal cation.

The secondary organic anion may be selected from a wide range of organic anions. Any compound is useable which will provide the desired organic anion alone or upon hydrolysis. Representative compounds include:

(1) acid anhydrides including acetic anhydride, maleic anhydride, succinic anhydride and phthalic anhydride;

(2) acid halides including acetyl chloride octanoyl chloride, lauroyl chloride, lauroyl bromide and benzoyl bromide;

(3) 1,1,1-trihalides including 1,1,1-trichloroethane and 1,1,1-tribromooctane; and (4) orthoesters including ethylorthoformate, and ethylorthostearate.

Exemplary types of suitable acidic functional organic compounds useful in this invention include:

(1) Carboxylic acids including:
(a) benzenecarboxylic acids such as benzoic acid; ortho-, meta- and para-phthalic acid; 1,2,3-benzenetricarboxylic acid; 1,2,4-benzenetricarboxylic acid; 1,3,5-benzenetricarboxylic acid; 1,2,4,5-benzenetetracarboxylic acid; 1,2,3,4,5,6-benzenehexacarboxylic acid (mellitic acid);
(b) alkyl carboxylic acids having the formula H—$(CH_2)_n$—COOH, wherein n is a number from 0 to 20, such compounds include acetic acid; propionic acid; butanoic acid; pentanoic acid; hexanoic acid; heptanoic acid; octanoic acid; nonanoic acid; decanoic acid; undecanoic acid; lauric acid; tridecanoic acid; tetradecanoic acid; pentadecanoic acid; hexadecanoic acid; heptadecanoic acid; octadecanoic acid (stearic acid); nonadecanoic acid; eicosanoic acid.
(c) alkyl dicarboxylic acids having the formula HOOC—$(CH_2)_n$—COOH, wherein n is 0 to 8 such as oxalic acid; malonic; succinic acid; glutaric acid; adipic acid; pimelic acid; suberic acid; azelaic acid; sebacic acid;
(d) hydroxyalkyl carboxylic acids such as citric acid; tartaric acids; malic acid; mandelic acid; and 12-hydroxystearic acid;
(e) unsaturated alkyl carboxylic acids such as maleic acid; fumaric acid; and cinnamic acid;
(f) fused ring aromatic carboxylic acid such as naphthalenic acid; and anthracenecarboxylic acid;
(g) cycloaliphatic acids such as cyclohexanecarboxylic acid; cyclopentanecarboxylic acid; furancarboxylic acids.

(2) Organic sulfur acids including:
(a) sulfonic acids including (1) benzenesulfonic acid such as benzenesulfonic acid; phenolsulfonic acid; dodecylbenzenesulfonic acid; benzenedisulfonic acid, benzenetrisulfonic acids; para-toluenesulfonic acid; and
(2) alkyl sulfonic acids such as methanesulfonic acid; ethanesulfonic acid; butanesulfonic acid; butanedisulfonic acid; sulfosuccinate alkyl esters such as dioctyl succinylsulfonic acid; and alkyl polyethoxysuccinylsulfonic acid; and
(b) alkyl sulfates such as the lauryl half ester of sulfuric acid, the octadecyl half ester of sulfuric acid, and octyl half ester of sulfuric acid.

(3) Organophosphorus acids including:
(a) phosphonic acids having the formula:

wherein R is an aryl group or alkyl group having 1 to 22 carbon atoms;
(b) phosphinic acids having the formula:

wherein R is an aryl group or alkyl group having 1 to 22 carbon atoms, such as dicyclohexylphosphinic acid; dibutylphosphinic acid; and dilaurylphosphinic acid;
(c) thiophosphinic acids having the formula:

wherein R is an aryl group or alkyl group having 1 to 22 carbon atoms such as di-iso-butyl dithiophosphinic acid; dibutyl dithiophosphinic acid; dioctadecyl dithiophosphinic acid;
(d) phosphites, that is, diesters of phosphorous acid having the formula: HO-P(OR)$_2$ wherein R is an alkyl group having 1 to 22 carbon atoms such as dioctadecylphosphite;
(e) phosphates, that is, diesters of phosphoric acid having the formula:

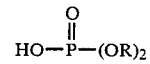

wherein R is an alkyl group having 1 to 22 carbon atoms, such as dioctadecylphosphate.

(4) Phenols such as phenol; hydroquinone; t-butylcatechol; p-methoxyphenol; and naphthols.

(5) thioacids having the formula:

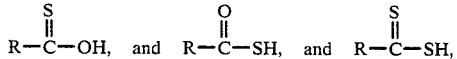

wherein R is an aryl group or alkyl group having 1 to 22 carbon atoms, such as thiosalicylic acid; thiobenzoic acid; thioacetic acid; thiolauric acid; and thiostearic acid.

(6) Amino acids such as the naturally occurring amino acids and derivatives thereof such as 6-aminohexanoic acid; 12-aminododecanoic acid; N-phenylglycine; and 3-aminocrotonic acid.

(7) Polymeric acids prepared from acidic monomers wherein the acidic function remains in the polymer chain such as low molecular weight acrylic acid polymers and copolymers; styrene maleic anhydride copolymers.

(8) Miscellaneous acids and acid salts such as ferrocyanide; ferricyanide; sodium tetraphenylborate; phosphotungstic acid; phosphosilicic acid, or any other such anion which will form a tight ion pair with an organic cation, i.e., any such anion which forms a water insoluble precipitate with an organic cation.

The organophilic clays of this invention can be prepared by admixing the clay, organic cation, organic anions and water together, preferably at a temperature within the range from 20° C. to 100° C., more preferably 60° C. to 77° C. for a period of time sufficient for the organic cation and organic anion complexes to intercalate with the clay particles, followed by filtering, washing, drying and grinding. The addition of the organic cation and organic anions may be done either separately or as a complex. In using the organophilic clays in emulsions, the drying and grinding steps may be eliminated. When admixing the clay, organic cation, organic anions and water together in such concentrations that a slurry is not formed, then the filtration and washing steps can be eliminated.

The clay is preferably dispersed in water at a concentration from about 1 to 80% and preferably 2% to 7%, the slurry optionally centrifuged to remove non-clay impurities which constitute about 10% to about 50% of the starting clay composition, the slurry agitated and heated to a temperature in the range from 60° C. to 77° C.

The organophilic clays of the invention may be prepared by admixing the organic anions with a clay and water together, preferably at a temperature between 20° C. and 100° C. for a sufficient time to prepare a homogenous mixture followed by the addition of the organic cation in sufficient amounts to satisfy the cation exchange capacity of the clay and the cationic capacity of the organic anions. The mixture is reacted with agitation at a temperature between 20° C. and 100° C. for a sufficient time to allow the formation of organic cation-organic anion complexes which are intercalated with the clay and the cation exchange sites of the clay are substituted with the organic cation. Reaction temperatures below 20° C. or above 100° C. while usable are not preferred because of the need for additional processing apparatus, namely cooling devices and pressure reactors.

The total amount of the organic anions added to the clay for purposes of this invention must be sufficient to impart to the organophilic clay the enhanced dispersion characteristic desired. This amount is defined at the milliequivalent ratio which is the number of milliequivalents (M.E.) of the organic anion in the organo-clay per 100 grams of clay, 100% active clay basis. The organophilic clays of this invention must have a total anion milliequivalent ratio of 5 to 100 and preferably 10 to 50. At lower anion milliequivalent ratios the enhanced dispersibility and efficiency of the organophilic clays are negligible. At higher anion M.E. ratios the efficiency of the organophilic clay reaction product is reduced from nonintercalated organic cation-organic anion complexes or ion pairs.

The organic anions are preferably added to the reactants in the desired milliequivalent ratio as a solid or solution in water under agitation to effect a macroscopically homogenous mixture. The anions may be added either simultaneously or sequentially in whole or part.

Of the total organic anion mixture employed, at least 50 molar % is preferably selected from the primary organic anions. It appears that use of such desired amounts enables the primary organic anions to synergistically aid in dispersion of the organophilic clay whereas the secondary organic anions merely aid in improving the organophilic clay efficiency, noteably viscosity increasing properties. Use of lesser amounts do not result in the unexpected improvement in dispersion and efficiency achieved from a mixture of organic anions as described herein.

The exact mechanism by which this action occurs is not fully known. However, one explanation for this effect may be proposed as follows.

It is known in general that the ease of dispersion of an anionically modified organophilic clay improves as the amount of an anion, expressed as the number of milliequivalents per 100 g of clay, 100% active clay basis, approaches that amount of cation, also expressed in milliequivalents per 100 g of clay, 100% active clay basis, in excess of the cation exchange capacity of the clay. This is probably due to (a) the basic incompatibility of highly ionic compounds (i.e., the organic cation having an inorganic anion) with the non-aqueous fluids in which the organophilic clay is to be dispersed, and (b) the reduction in the ionic nature of the cationic salt by reaction of said cation with an organic anion to form an independent complex having a very small ionization constant. Indeed, similar results are seen with the compositions of this invention as the amount of primary anion, i.e. the sulfur containing anion, is increased to a point such that further additions lead to a reduction in the ease of dispersion of the organophilic clay. This effect is not obtained when using a second anion, that is, the compatibility of the organic phase of the organophilic clays of this invention in the presence of a non-aqueous fluid may be further improved by the inclusion of a second anion which appears to reduce the quantity of the highly ionic inorganic anion salt form of the adsorbed organic cation. This effect does not negate the adverse effect achieved by using excess primary anion.

Secondly, it has been found that the organic cation/organic sulfur anions used as a part of this invention in general tend to be less waxy in nature than organic cations having an inorganic anion or organic carboxylate anion. This property is carried over into the organophilic clay, and aids in the reduction of interfacial tension. In doing so, the random orientation of the organophilic clay platelets is maintained through the drying process, leading to an organophilic clay agglomerate particle having a very open and porous structure. Such structure allows rapid imbibition of solvent into the particle, as well as reducing the area of face to face interactions of the organophilic clay platelets, both of which aid in the dispersion of the organophilic clay.

The organic cation is employed in a sufficient quantity to at least satisfy the cation exchange capacity of the clay and the cationic activity of the organic anions. Additional cation above the sum of the exchange capacity of the clay and anions may be optionally used. It has been found when using the smectite-type clays of this invention that use of at least 90 milliequivalents of organic cation is sufficient to satisfy at least a portion of the total organic cation requirement. Use of amounts from 80 to 200 M.E., and preferably 100 to 160 M.E. are acceptable. At lower milliequivalent ratios incomplete reaction between the organic cation and clay or organic anions will occur resulting in the formation of ineffective gellants. Preferably the cation milliequivalent ratio is greater than (100+n) milliequivalents where n is defined as the number of milliequivalents of the primary organic anion in milliequivalents per 100 grams of clay, 100% active clay basis.

For convenience of handling it is preferred that the total organic content of the organophilic clay reaction products of this invention should be less than about 50% by weight of the organoclay. While higher amounts are usable, the reaction product is difficult to filter, dry and grind.

A preferred process for preparing an organophilic clay gellant may be described more particularly which involves:

(a) preparing a slurry of smectite-type clay in water at 1 to 80% by weight of said clay;

(b) heating the slurry to a temperature between 20° C. and 100° C.;

(c) adding 5 to 100 milliequivalents total of an organic anion mixture per 100 grams of clay, 100% active clay basis and an organic cation in a sufficient amount to satisfy the cation exchange capacity of the smectite-type clay and the cationic activity of the organic anions while agitating the reaction mixture, said amount of organic cation being at least (100+n) milliequivalents where n is the amount of a primary anion expressed in milliequivalents per 100 grams of clay, 100% active clay basis;

(d) continuing the reaction for a sufficient time to form a reaction product comprising organic cation-organic anion complexes which are intercalated with the smectite-type clay and the cation exchange sites of the smectite-type clay are substituted with the organic cation; and (e) recovering the reaction product.

In another preferred embodiment a process for preparing an organophilic clay gellant involves:

(a) preparing a slurry of smectite-type clay in water at 2 to 7% by weight of said clay;

(b) heating the slurry to a temperature between 20° C. and 100° C.;

(c) adding an organic cation in an amount up to the cation exchange capacity of the smectite-type clay to the clay slurry under agitation to prepare an organophilic clay reaction product;

(d) adding 5 to 100 milliequivalents total of an organic anion mixture per 100 grams of clay, 100% active clay basis, with agitation to prepare a homogeneous mixture;

(e) adding additional amounts of an organic cation to the homogeneous mixture in a sufficient amount to satisfy the available remaining cation exchange capacity of the smectite-type clay and cationic activity of the organic anion, while agitating the reaction mixture, the total amount of organic cation being at least (100+n) milliequivalents where n is the amount of a primary anion present in the anion mixture expressed in milliequivalents per 100 grams of clay, 100% active clay basis.

(f) continuing the reaction for a sufficient time to form a reaction product comprising organic cation-organic anion complexes which are intercalated with the smectite-type clay and the cation exchange sites of the smectite-type clay are substituted with the organic cation; and (g) recovering the reaction product.

An additional preferred process for preparing an organophilic clay gellant also involves:

(a) preparing a slurry of smectite-type clay in water at 2 to 7% by weight of said clay;

(b) heating the slurry to a temperature between 20° C. and 100° C.;

(c) adding 5 to 100 milliequivalents total of an organic anion mixture per 100 grams of clay, 100% active clay basis, with agitation to prepare a homogeneous mixture;

(d) adding amounts of an organic cation to the homogeneous mixture in a sufficient amount to satisfy the available cation exchange capacity of the smectite-type clay and cationic activity of the organic anion, while agitating the reaction mixture, said amount of organic cation being at least (100+n) milliequivalents where n is the amount of a primary anion mixture expressed in milliequivalents per 100 grams of clay, 100% active clay basis.

(e) continuing the reaction for a sufficient time to form a reaction product comprising organic cation-organic anion complexes which are intercalated with the smectite-type clay and the cation exchange sites of the smectite-type clay are substituted with the organic cation; and (f) recovering the reaction product.

The compositions of the invention as discussed above find wide utility as rheological additives in non-aqueous fluid systems generally. The non-aqueous fluid compositions in which the self activating organophilic clays are useful include paints, varnishes, enamels, waxes, epoxies, mastics, adhesives, cosmetics, inks, polyester laminating resins and polyester gel coats, and the like. These fluids may be prepared by any conventional method such as described in U.S. Pat. No. 4,208,218 including colloid mills, roller mills, ball mills, and high speed dispersers, in which the pigment materials become well dispersed in the organic vehicle by the high shear used in processing.

The organophilic clay gellant is employed in such compositions in amounts sufficient to obtain the desired rheological properties such as high viscosity at low shear rates, control of sagging of fluid films and prevention of settling and hard packing of pigments present in the non-aqueous fluid compositions. Amounts of the organophilic clay gellant employed in the non-aqueous fluid system should preferably be between about 0.1% and about 10% based on the weight of the treated non-aqueous fluid system and preferably between 0.3% and 5.0% to yield the desired rheological effects.

Coating compositions in general comprise a film forming organic and/or inorganic binder, solvents, and optionally pigments. Such systems have been described heretofore for use as decorative and/or protective materials for e.g., metal, wood, plastics, and paper. In practice, these compositions are applied to the substrate with equipment such as a brush, a roller, air or airless atomization, or dipping. In these compositions, thixotropic gelling agents may be employed which decrease the viscosity of the coating composition at high shear such as would be employed during the application of the coating but which increase the viscosity under low or no shear conditions.

In the past, asbestos, fumed silica, various organic materials, and organophilic clays have been employed as efficient gelling agents for such coating compositions. However, these materials have suffered from various disadvantages such as creation of health hazards, high cost-performance levels and preparation of inadequate coating compositions lacking in gloss and surface smoothness.

The organophilic clays of this invention have been employed as effective gellants for coating compositions without the difficulties associated with the prior art materials. The organophilic clays may be dispersed in the coating compositions under low or optionally high shear conditions.

In a typical procedure, the organophilic clay gellant is added to a coating composition comprising a film forming organic binder, organic solvent, and optionally pigments under agitation at 625 lineal feet per minute and stirred at this speed for 15 minutes to insure complete dispersion of the organophilic clay.

The film forming organic binders of this invention are prepared by conventional procedures such as polymerization of acrylate and methacrylate esters; from saturated polyester resins; and by reaction of drying oils such as linoleic acid with polymers containing hydroxyl functionality. Generally, organic binders having gram molecular weights of 200 to several hundred thousand are useful.

Organic solvents for such coatings may be broadly classified into five categories which include aliphatic, aromatic, moderately polar, polar and chlorinated solvent. Aliphatic solvents include normal and branched chain aliphatic hydrocarbons having from about 5 to 12 carbon atoms and cycloaliphatic compounds. Aromatic solvents include such materials as benzene, toluene, xylene and ethyl benzene. Moderately polar solvents include ketonic and ester solvents such as acetone, methyl ethyl ketone, methyl butyl ketone, methyl isobutyl ketone, cyclohexanone, ethyl acetate, butyl acetate, ethoxyethyl acetate, and the like. Polar solvents include such materials as low molecular weight alcohols such as methanol, ethanol, propanol, 2-propanol, butanol, 2-butanol, and ethoxyethanol. Chlorinated hydrocarbon solvents include such materials as methylene chloride, chloroform, carbon tetrachloride, chloroethane, and 1,1,1-trichloroethane.

The organic binder may be conveniently employed in amounts of 10% to 80% of the liquid portion of the coating composition. The organic solvent is employed in sufficient amounts to reduced the viscosity of the coating composition to usable levels depending on the method of application, but in any case to yield up to 100% of the total composition. Supplemental additives including pigments may be employed in quantities ranging from 0.5 to 50% of the total coating composition.

The following examples are given to illustrate the invention, but are not deemed to be limiting thereof. All percentages given throughout the specification are based upon weight unless otherwise indicated.

EXAMPLE A—Runs 1 to 12

This example demonstrates the use of various organophilic clays prepared from different organic cations and organic anions. The ingredients and amounts thereof used to prepare each coating composition are summarized in Table 1 (Aliphatic Pigmented Solvent System).

The results show that the inventive compositions, when post-added to a previously prepared coating system at low shear, impart superior viscosity to the system and dispersed to the same level as conventionally employed materials when incorporated into the system under a significantly higher shear condition. Also, the comparative materials when incorporated into the system at lower shear condition are decidedly inferior in dispersibility, viscosity built properties compared to the inventive material incorporated into the system at the same shear.

The organophilic clays of this invention having the mixed anion composition as per the Table were post-added under low shear conditions into the coating composition without a polar solvent activator. For comparison, various organophilic clays containing single organic anions were also post-added to the coating composition at the same shear condition as the test organophilic clay.

Specifically, 600 grams of a previously prepared coating composition, not containing a rheological additive, was weighed into a derimmed circular quart can which measures 4 inches in diameter and 4⅝ inches in height. The system is agitated using a laboratory mixer with a 2 inch diameter propeller blade. The blade is positioned in the system at the center of the quart can at a height such that the bottom of the blade is ½ inch above the bottom surface of the can. The shaft speed is held constant at 1200 rpm. 5.1 grams of the organophilic clays of this invention and comparative organophilic clays are slowly sifted into the swirling system.

The system plus organophilic clay is allowed to mix at a shaft speed of 1200 rpm for a total of 15 minutes. At this time, without stopping the agitation, a small aliquot is withdrawn from the quart container using a tapered 5 inch stainless steel spatula. This aliquot is used to measure the fineness of dispersion of the mixture according to "Standard Test Method for Fineness of Dispersion of Pigment - Vehicle Systems"; ASTM Designation: D1210-64 (reapproved 1970). This measurement is made using a Hegman fineness of grind gauge rated in a scale that ranges from 0 to 8 where 0 is equal to a film thickness of 4 mils and 8 is equal to a film thickness of zero mils. The grind gauge is a stainless steel block into which a channel of continually varying depth has been cut out. The solution to be tested is placed into the channel at the deepest end and cast down the full length of the channel. The fineness of grind of the system is determined at the point along the channel depth at which the pigment particles are first visible above the surface of the solution film. This measurement is taken after 15 minutes mixing time. The systems are then transferred to a tin can and allowed to equilibrate overnight at 25° C. before being tested for viscosity where applicable.

The viscosity increasing properties are measured using a Brookfield RVT model viscometer equipped with a #4 spindle at a spindle speed of 10 rpm.

In Table II the data demonstrates the preparation of coating systems having an improved ease of dispersion and/or greater viscosity build at low shear conditions as compared with the conventional additives.

In Runs 1 to 6 the total organic anion milliequivalent (M.E.) ratio was kept constant at 30 M.E.; in Runs 7 to 12 it was kept constant at 22.5 M.E. These Runs compared the effect resulting from employing two separate sulfur containing organic anions. The data shows an increase in completeness of dispersibility as the amount of primary anion increased in comparison to the controls (Runs 1, 7, 8 and 12) having only a single anion. Also demonstrated is a reduction in time needed to achieve a clean grind (C1) over a scattered grind (SC) by increasing the amount of primary anion. This is significant since it shows improved ease of dispersion over time, rendering processing more efficient and thus allowing post batch addition of the rheological additive to a finished nonaqueous fluid system (such as paint), which method of addition was not heretofore possible. Run I demonstrates the conventional use of an organoclay by use of high shear incorporation and polar activator rather than low shear post addition without activators. If this material were employed under low shear as in Run II, the organoclay provides a zero grind and minimal viscosity build.

In Table II, the data demonstrates the preparation of coating systems having an improved ease of dispersion and/or greater viscosity build at low shear conditions as compared with the conventional additives.

EXAMPLE B—Runs 13 to 23

This Example demonstrates the use of primary organic anion, i.e. specifically sulfur containing anion and a nonsulfur containing second organic anion.

The procedure of Example A was repeated with the same system using the rheological additives recited in Table III. The results demonstrate that increasing the amount of primary organic anion results in improving grind and reducing the time necessary to achieve a clear grind.

TABLE I

| Ingredients | Generic Name | Manufacturer | Blank (No Thickener) Pounds | Control Normal Processing (High Shear) Pounds | Experimental Low Shear Processing (Post Addition) Pounds |
|---|---|---|---|---|---|
| ALIPHATIC PIGMENTED SOLVENT SYSTEM | | | | | |
| MILLBASE | | | | | |
| Aroplaz 1266M70 | Long Oil Soya Alkyd Resin Solution (70% N.V.) | Spencer Kellogg Div. of Textron, Inc. | 66.1 | 66.1 | 66.1 |
| Mineral Spirits 663 | Aliphatic Hydrocarbon | Union Oil Company of California | 66.7 | 66.7 | 66.7 |
| Methanol/Water, 95/5 | — | — | — | 3.3 | — |
| BENTONE 34 Gellant | Comparative rheological additive | NL Industries, Inc. | | 10.0 | |
| TITANOX 2020 | Titanium Dioxide Rutile | NL Industries, Inc. | 240.1 | 240.1 | 240.1 |
| Atomite | Calcium Carbonate Natural Ground | Thompson, Weinmann & Co. | 191.3 | 191.3 | 191.3 |
| GRIND AT HIGH SPEED - 5400 RPM FOR 15 MINUTES | | | | | |
| LET DOWN - ADD IN ORDER LISTED WITH MIXING AT 2,000 RPM | | | | | |
| Aroplaz 1266 M70 | Long Oil Soya Alkyd Resin Solution (70% N.V.) | Spencer Kellogg Div. of Textron, Inc. | 241.4 | 241.4 | 241.4 |
| Aroflat 3113P0 | Thixotropic Alkyd | Spencer Kellogg Div. of Textron, Inc. | 191.3 | 191.3 | 191.3 |
| Mineral Spirits 663 | Aliphatic hydrocarbon | Union Oil Company of California | 46.8 | 46.8 | 46.8 |
| Paint Drier | 6% Cobalt Naphthenate | Tenneco Chemical, Inc. | 1.8 | 1.8 | 1.8 |
| Paint Drier | 4% Calcium Naphthenate | Tenneco Chemical, Inc. | 8.6 | 8.6 | 8.6 |
| Exkin #2 | Oxime Antiskin Agent | Tenneco Chemical, Inc. MIX AT 1200 RPM | 1.0 | 1.0 | 1.0 |
| Stir-In Thickener | Organophilic clay | Experimental | — | — | 10.0 |
| | | TOTALS | 1055.1 | 1068.4 | 1065.1 |

TABLE II

| Example A Runs | Rheological Additive (ME Ratio) / Primary/ Secondary Quaternary/ anion/ anion | Fineness of Grind (minutes) | | | | Viscosity (cPs) 24 hours |
|---|---|---|---|---|---|---|
| | | 9 | 11 | 13 | 15 | |
| I | 95 2M2HT/None/None | 6.5cl | 6.5cl | 6.5cl | 6.5cl | 952 |
| II | 95 2M2HT/None/None | 0 | 0 | 0 | 0 | 350 |
| 1 | 130 BM2HT/0 SLS/30 PPS | 0 | 2sc | 3sc | 5sc | 1072 |
| 2 | 130 BM2HT/5 SLS/25 PPS | 0 | 2sc | 3.5sc | 4.5sc | 1060 |
| 3 | 130 BM2HT/10 SLS/20 PPS | 0 | 3sc | 4.5sc | 5.0sc | 1028 |
| 4 | 130 BM2HT/15 SLS/15 PPS | 0 | 5sc | 6.0sc | 6.0cl | 952 |
| 5 | 130 BM2HT/20 SLS/10 PPS | 5sc | 6.0cl | 6.5cl | 6.5cl | 896 |
| 6 | 130 BM2HT/25 SLS/5 PPS | 6cl | 6.5cl | 6.5cl | 6.5cl | 824 |
| 7 | 130 BM2HT/30 SLS/0 PPS | 2.5sc | 3sc | 3.0sc | 3.5sc | 668 |
| 8 | 122.5 BM2HT/0 SLS/22.5 PPS | 0 | 0 | 3sc | 3sc | 840 |
| 9 | 122.5 BM2HT/11.25 SLS/11.25 PPS | 6.0sc | 6.0sc | 6.0sc | 6.0sc | 820 |
| 10 | 122.5 BM2HT/15 SLS/7.5 PPS | 6.0sc | 6.0sc | 6.0sc | 6.5cl | 928 |
| 11 | 122.5 BM2HT/18.75 SLS/3.75 PPS | 4.0sc | 5.0sc | 6.0sc | 6.0sc | 824 |
| 12 | 122.5 BM2HT/22.5 SLS/0 PPS | 0.0 | 1.0sc | 1.0sc | 1.0sc | 680 |

BM2HT: Benzyl methyl dihydrogenated tallow ammonium bentonite
SLS: Sodium laurylsulfate
PPS: Para-phenolsulfonate
2M2HT: Dimethyl dihydrogenated tallow ammonium bentonite

TABLE III

| Example B Runs | Rheological Additive (ME Ratio) Quaternary/ Primary anion/ Secondary anion | Fineness of Grind (minutes) 9 | 11 | 13 | 15 | Viscosity (cPs) 24 hours |
|---|---|---|---|---|---|---|
| 13 | 130 BM2HT/0 SLS/30 Bz | 0 | 3sc | 5sc | 5sc | 1000 |
| 14 | 130 BM2HT/10 SLS/20 Bz | 0 | 4 | 5sc | 6sc | 1016 |
| 15 | 130 BM2HT/15 SLS/15 Bz | 6sc | 6sc | 6.5sc | 6.5cl | 1020 |
| 16 | 130 BM2HT/20 SLS/10 Bz | 6sc | 6sc | 6.5sc | 6.5cl | 916 |
| 17 | 130 BM2HT/25 SLS/5 Bz | 6sc | 6.5sc | 6.5cl | 6.5cl | 840 |
| 18 | 130 BM2HT/30 SLS/0 Bz | 2.5sc | 3sc | 3sc | 2.5sc | 668 |
| 19 | 122.5 BM2HT/0 SLS/22.5 Bz | 0 | 0 | 3sc | 4sc | 896 |
| 20 | 122.5 BM2HT/11.25 SLS/11.25 Bz | 0 | 6sc | 6sc | 6cl | 960 |
| 21 | 122.5 BM2HT/15 SLS/7.5 Bz | 6sc | 6sc | 6sc | 6cl | 960 |
| 22 | 122.5 BM2HT/18.75 SLS/3.75 Bz | 6sc | 6cl | 6cl | 6cl | 820 |
| 23 | 122.5 BM2HT/22.5 SLS/0 Bz | 0 | 1sc | 1sc | 1sc | 680 |

BM2HT: Benzyl methyl dihydrogenated tallow ammonium bentonite
SLS: Sodium laurylsulfate
Bz: Benzoate

EXAMPLE C—Runs 24 to 35

This Example demonstrates the use of organophilic clays made from different quaternary amines (organic cations) and different mixtures of primary and secondary organic anions.

The particular clay compositions and results obtained are recited in Table IV. The procedure of Example A was repeated with the same system using the rheological additives recited in the Table.

The results show the unexpected ease of dispersion obtained when using an organophilic clay modified with two separate organic anions when one of the anions is a particular sulfur containing compound. Runs 24 and 25 demonstrate poor grind results when using conventional clays in the absence of anionic compounds. Runs 29, 30, 31 and 32 demonstrate the activity achieved by using different cation-anion combinations. Several of these runs do not demonstrate optimum performance under the test conditions which is believed to result from the noncompatability of the quaternary employed with the solvent system being evaluated.

TABLE IV

| Example C Runs | Rheological Additive (ME Ratio) Quaternary/ Primary anion/ Secondary anion | Fineness of Grind (minutes) 7 | 9 | 11 | 13 | 15 | Viscosity (cPs) 24 hours |
|---|---|---|---|---|---|---|---|
| 24 | 125 BM2HT/None/None | 0 | 0 | 0 | 1sc | 2sc | 892 |
| 25 | 125 2M2HT/None/None | 0 | 0 | 0 | 0 | 0 | 596 |
| 26 | 130 BM2HT/25 SLS/5 Bz | 6.5sc | 6.5sc | 6.5sc | 6.5cl | 6.5cl | 688 |
| 27 | 125 BM2HT/25 SLS/None | 1.5sc | 6.5sc | 6.5sc | 6.5sc | 6.5sc | 696 |
| 28 | 125 2M2HT/20 SLS/None | 0 | 0 | 0 | 0 | 0 | 496 |
| 29 | 125 BM2HT/20 SLS/5 Bz | 6.5sc | 6.5sc | 6.5sc | 6.5cl | 6.5cl | 780 |
| 30 | 125 2M2HT/20 SLS/5 Bz | 4.5sc | 4.5sc | 5.5sc | 5sc | 5.5sc | 672 |
| 31 | 125 BM2HT/20 DDS/5 Bz | 0 | 0 | 6.5sc | 6.5sc | 6.5sc | 904 |
| 32 | 125 2M2HT/20 DDS/5 Bz | 0 | 0 | 0 | 6.5sc | 6.5sc | 900 |
| 33 | 125 BM2HT/25 DDS/None | 0 | 0 | 0 | 0 | 4 | 768 |
| 34 | 125 BM2HT/20 DCS/5 Bz | 0 | 0 | 0 | 0 | 3sc | 808 |
| 35 | 125 BM2HT/20 DCS/5 PPS | 0 | 0 | 0 | 6.5sc | 6.5sc | 808 |

BM2HT: Benzyl methyl dihydrogenated tallow ammonium bentonite
2M2HT: Dimethyl dihydrogenated tallow ammonium bentonite
SLS: Sodium laurylsulfate
Bz: Benzoate
DDS: Sodium dodecanesulfonate
DCS: Decanesulfonate
PPS: Para-phenolsulfonate

EXAMPLE D—RUNS 26 to 49

This example demonstrates the use of alternate sulfur compound sources falling within the primary organic anion category.

The procedure of Example A was repeated with the same system using the rheological additives recited in the Table V.

TABLE V

| Example D Runs | Rheological Additive (ME Ratio) Quaternary/ Primary anion/ Secondary anion | Fineness of Grind (minutes) 7 | 9 | 11 | 13 | 15 | Viscosity (cPs) 24 hours |
|---|---|---|---|---|---|---|---|
| 36 | 125 BM2HT/20 tridecyl sulfate/5 NaBz | 0 | 0 | 0 | 1sc | 2sc | 892 |
| 37 | 125 BM2HT/20 tridecyl sulfate/5 NaPPS | 0 | 1sc | 1sc | 1.5sc | 2sc | 669 |
| 38 | 125 BM2HT/20 sodium tallow sulfate/5 NaBz | 6.5sc | 6.5sc | 6.5cl | 6.5cl | 6.5cl | 1104 |
| 39 | 125 BM2HT/20 sodium tallow sulfate/5 NaPPS | 6.5sc | 6.5sc | 6.5cl | 6.5cl | 6.5cl | 1036 |
| 40 | 125 BM2HT/20 sodium tallow sulfonate/5 NaPPS | 6.5sc | 6.5sc | 6.5cl | 6.5cl | 6.5cl | 1036 |
| 41 | 125 BM2HT/20 sodium tallow sulfonate/5 NaBz | 0 | 6.5sc | 6.5cl | 6.5cl | 6.5cl | 1236 |
| 42 | 125 BM2HT/20 sodium laurylsulfate/5 NaBz | 6.5sc | 6.5cl | 6.5cl | 6.5cl | 6.5cl | 1096 |
| 43 | 125 BM2HT/20 SDBS/5 NaBz | 0 | 6.5sc | 6.5sc | 6.5sc | 6.5sc | 1100 |
| 44 | 125 BM2HT/20 SDBS/5 NaPPS | 0 | 6.5sc | 6.5sc | 6.5sc | 6.5sc | 1172 |
| 45 | 125 BM2HT/20 STDS/5 NaBz | 0 | 1sc | 2sc | 6.5sc | 6.5sc | 1208 |

TABLE V-continued

| Example D Runs | Rheological Additive (ME Ratio) Quaternary/ / Primary/ anion/ Secondary anion | Fineness of Grind (minutes) 7 | 9 | 11 | 13 | 15 | Viscosity (cPs) 24 hours |
|---|---|---|---|---|---|---|---|
| 46 | 125 BM2HT/20 STDS/5 NaPPS | 0 | 2sc | 6.5sc | 6.5sc | 6.5sc | 1176 |
| 47 | 125 BM2HT/20 SHDS/5 NaBz | 0 | 1sc | 6.5sc | 6.5sc | 6.5sc | 1068 |
| 48 | 125 BM2HT/20 SHDS/5 NaPPS | 0 | 1sc | 1sc | 2sc | 6.5sc | 1028 |
| 49 | 125 BM2HT/20 SDS/5 NaPPS | 0 | 6.5sc | 6.5sc | 6.5sc | 6.5sc | 1220 |

BM2HT: Benzyl methyl dihydrogenated tallow ammonium bentonite
NaPPS: Sodium para-phenolsulfonate
NaBz: Sodium benzoate
SDBS: Sodium dodecylbenzenesulfonate
STDS: (branched) Sodium tetradecylsulfate
SHDS: Sodium heptadecylsulfate
SDS: Sodium tetradecylsulfate

EXAMPLE E—RUNS 50 to 56

This example demonstrates the use of various organic anions and the criticality of employing the instant primary organic sulfur containing anions having a carbon chain length of greater than 9 carbon atoms.

The procedure of Example A was repeated with the same nonaqueous solvent system using the rheological additives recited in Table VI.

The results show an enhanced dispersibility effect achieved when using a sulfate organic anion versus a carboxylate anion either along or in combination with a second anion. The results also show that this unexpected effect is only achieved with organic sulfur anions having long chain lengths.

TABLE VI

| Example D Runs | Rheological Additive (ME Ratio) Organic/ Primary/ Secondary Cation/ Organic/ Organic / Anion/ Anion or Comparative Carboxylic acid | Fineness of Grind (minutes) 7 | 9 | 11 | 13 | 15 | Viscosity (cPs) 24 hours |
|---|---|---|---|---|---|---|---|
| 50 | 125 BM2HT/20 sodium octyl sulfate/None | 6.5sc | 6.5sc | 6.5sc | 6.5sc | 6.5sc | 1044 |
| 51 | 125 BM2HT/20 sodium octyl sulfate/5 Bz | 6.5sc | 6.5sc | 6.5sc | 6.5sc | 6.5sc | 1004 |
| 52 | 125 BM2HT/20 sodium laurate/5 Bz | 0 | 0 | 0 | 1sc | 2.5sc | 956 |
| 53 | 125 BM2HT/20 sodium lauryl sulfate/5 Bz | 6.5sc | 6.5sc | 6.5sc | 6.5sc | 6.5sc | 672 |
| 54 | 125 BM2HT/20 sodium stearate/5 Bz | 0 | 2sc | 6.5sc | 6.5sc | 6.5sc | 928 |
| 55 | 125 BM2HT/20 sodium stearyl sulfate/5 Bz | 6.5sc | 6.5sc | 6.5sc | 6.5cl | 6.5cl | 672 |
| 56 | 125 BM2HT/25 sodium stearyl sulfate/None | 3sc | 4sc | 4sc | 4.5sc | 4.5sc | 552 |

BM2HT: Benzyl methyl dihydrogenated tallow ammonium bentonite
Bz: Benzoate

The invention being thus described, it will be obvious that the same may be varied in many ways. Such variations are not to be regarded as a departure from the spirit and scope of the invention and all such modifications are intended to be included within the scope of the following claims.

What is claimed is:

1. An organophilic clay gellant useful for gelling organic liquids which comprises the reaction product of:
   (a) a smectite-type clay having a cation exchange capacity of at least 75 milliequivalents per 100 grams of said clay;
   (b) a primary anion selected from the group consisting of anions derived from organic sulfonic acids, alkylsulfates and mixtures thereof containing at least one lineal or branched alkyl group having greater than 9 carbon atoms, aromatic sulfonic acids and mixtures thereof;
   (c) a secondary anion different from said primary anion and selected from the group consisting of anions derived from organic acids having pKa of less than about 11.0 and mixtures thereof; and
   (d) an organic cation in an amount sufficient to satisfy the cation exchange capacity of said clay and the cationic activity of the primary and secondary anions wherein the resulting organic cation—organic anion complexes are intercalated with the smectite-type clay and wherein the combination of said primary and secondary anions increases the ease of dispersion of said organophilic clay gellant in an organic liquid to a degree greater than an equivalent amount of either the primary or secondary anion alone.

2. The organophilic clay gellant of claim 1 wherein the organic cation is selected from the group consisting of quaternary ammonium salts, phosphonium salts, sulfonium salts and mixtures thereof containing at least one lineal or branched alkyl group having 8 to 22 carbon atoms.

3. The organophilic clay gellant of claim 1 wherein the primary anion is derived from an organic acid having a pKa of less than about 11.0.

4. The organophilic clay gellant of claim 1 wherein the smectite-type clay is selected from the group consisting of hectorite and sodium bentonite.

5. The organophilic clay gellant of claim 1 wherein the total amount of said primary and secondary anions is from 5 to 100 milliequivalents per 100 grams of said clay, 100% active clay basis.

6. The organophilic clay gellant of claim 1 wherein the amount of said organic cation is from 80 to 200 milliequivalents per 100 grams of clay, 100% active clay basis.

7. The organophilic clay gellant of claim 1 wherein the amount of said organic cation is from 100 to 160 milliequivalents per 100 grams of clay, 100% active clay basis.

8. An organophilic clay gellant, which comprises; the reaction product of
   (a) a primary organic anion selected from the group consisting of anions derived from organic sulfonic acids, alkylsulfates and mixtures thereof containing at least one lineal or branched alkyl group having greater than 9 carbon atoms, aromatic sulfonic acids and mixtures thereof,
   (b) a secondary organic anion different from said primary anion and selected from the group consisting of anions derived from an organic acid having pKa less than abut 11.0, and mixtures thereof
   (c) an organic cationic compound selected from the group consisting of:

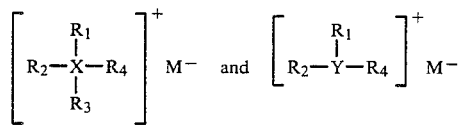

wherein X is nitrogen or phosphorus, Y is sulfur, $M^-$ is selected from the group consisting of chloride, bromide, iodide, nitrite, hydroxyl, acetate, methyl sulfate, and mixtures thereof; and wherein $R_1$ is an alkyl group containing 8 to 22 carbon atoms; and wherein $R_2$, $R_3$ and $R_4$ are selected from the group consisting of hydrogen, hydroxyalkyl groups, alkyl groups containing 1 to 22 carbon atoms, aryl groups, aralkyl groups containing 1 to 22 carbon atoms on the alkyl chain, and mixtures thereof; and
   (d) a smectite-type clay having a cation exchange capacity of at least 75 milliequivalents per 100 grams of said clay, such that organic cation—organic anion complexes are formed which complexes are intercalated with the smectite-type clay and the cation exchange sites of the smectitie-type clay are substituted with the organic cation wherein the combination of said primary and secondary anions increases the ease of dispersion of said organophilic clay gellant in an organic liquid to a degree greater than an equivalent amount of either the primary or secondary anion alone.

9. A process for preparing an organophilic clay gellant which comprises:
   (a) preparing a slurry of smectite-type clay in water at 1 to 80% by weight of said clay;
   (b) heating the slurry to a temperature between 20° C. and 100° C.;
   (c) adding (i) 5 to 100 milliequivalents total of an organic anion mixture per 100 grams of clay, 100% active clay basis, said organic anion mixture being composed of a primary anion selected from the group consisting of anions derived from organic sulfonic acids, alkylsulfates and mixtures thereof containing at least one lineal or branched alkyl group having greater than 9 carbon atoms, aromatic sulfonic acids and mixtures thereof and a secondary anion different from said primary anion and selected from the group consisting of anions derived from organic acids having a pKa of less than about 11.0, and mixtures thereof, and (ii) an organic cation in a sufficient amount to satisfy the cation exchange capacity of the smectite-type clay and the cationic activity of the organic cation being at least (100+n) milliequivalents where n is the amount of the primary anion expressed in milliequivalents per 100 grams of clay, 100% active clay basis;
   (d) continuing the reaction for a sufficient time to form a reaction product comprising organic cation-organic anion complexes which are intercalated with the smectite-type clay and the cation exchange sites of the smectite-type clay are substituted with the organic cation; and
   (e) recovering the reaction product wherein the mixture of said primary and secondary anions increases the ease of dispersion of said organophilic clay gellant in an organic liquid to a degree greater than an equivalent amount of either the primary or secondary anion alone.

10. The process of claim 9 wherein the organic cation is selected from the group consisting of quaternary ammonium salts, phosphonium salts and sulfonium salts containing at least one lineal or branched alkyl group having 8 to 22 carbon atoms.

11. The process of claim 9 wherein the primary anion is derived from an organic acid having a $pK_A$ of less than about 11.0.

12. The process of claim 9 wherein the smectite-type clay is selected from the group consisting of hectorite and sodium bentonite.

13. The process of claim 9 wherein the amount of said organic anion mixture is from 10 to 50 milliequivalents per 100 grams of said clay, 100% active clay basis.

14. The process of claim 9, wherein the amount of said organic cation is from 80 to 200 milliequivalents per 100 grams of clay, 100% active clay basis.

15. The process of claim 9 wherein the organic anion mixture is added to the smectite-type clay prior to the addition of the organic cation.

16. The process of claim 9 wherein the organic anions and organic cation are added to the smectite-type clay in the form of an organic cation-organic anion complexes.

17. The process of claim 9 wherein the organic anion mixture is obtained by sequentially adding one of said primry or secondary anions and then the other.

18. A process for preparing an organophilic clay gellant which comprises:
   (a) preparing a slurry of smectite-type clay in water at 2 to 7% by weight of said clay;
   (b) heating the slurry to a temperature between 20° C. and 100° C.;
   (c) adding an organic cation in an amount up to the cation exchange capacity of the smectite-type clay to the clay slurry under agitation to prepare an organophilic clay reaction product.
   (d) adding 5 to 100 milliequivalents total of an organic anion mixture per 100 grams of clay, 100% active clay basis, with agitation to prepare a homogenous mixture, said organic anion mixture being composed of a primary anion selected from the group consisting of anions derived from organic sulfonic acids, alkylsulfates and mixtures thereof containing at least one lineal or branched alkyl group having greater than 9 carbon atoms, aromatic sulfonic acids and mixtures thereof and a secondary anion different from said primary anion and selected from the group consisting of anions derived from organic acids having a pKa of less than about 11.0, and mixtures thereof;

(e) adding additional amounts of an organic cation to the homogeneous mixture in a sufficient amount to satisfy the available remaining cation exchange capacity of the smectite-type clay and cationic activity of the organic anion, while agitating the reaction mixture the total amount of organic cation being at least (1000+n) milliequivalents where n is the amount of the primary anion present in the anion mixture expressed in milliequivalents per 100 grams of clay, 100% active clay basis;

(f) continuing the reaction for a sufficient time to form a reaction product comprising organic cation-organic anion complexes which are intercalated with the smectite-type clay and the cation exchange sites of the smectite-type clay are substituted with the organic cation; and (g) recovering the reaction product wherein the mixture of said primary and secondary anions increases the ease of dispersion of said organophilic clay gellant in an organic liquid to a degree greater than an equivalent amount of either the primary or secondary anion alone.

19. The process of claim 18 wherein the organic anion mixture is obtained by sequentially adding one of said primry or secondary anions and then the other.

20. A process for preparing an organophilic clay gellant which comprises:

(a) preparing a slurry of smectite-type clay in water at 2 to 7% by weight of said clay;

(b) heating the slurry to a temperature between 20° C. and 100° C.;

(c) adding 5 to 100 milliequivalents total of an organic anion mixture per 100 grams of clay, 100% active clay basis, with agitation to prepare a homogeneous mixture, said organic anion mixture being composed of a primary anion selected from the group consisting of anions derived from organic sulfonic acids, alkylsulfates and mixtures thereof containing at least one lineal or branched alkyl group having greater than 9 carbon atoms, aromatic sulfonic acids and mixtures thereof and a secondary anion different from said primary anion and selected from the group consisting of anions derived from organic acids having a pK$_A$ of less than about 11.0, and mixtures therof;

(d) adding amounts of an organic cation to the homogeneous mixture in a sufficient amount to satisfy the available cation exchange capacity of the smectite-type clay and cationic activity of the organic anion, while agitating the reaction mixture said amount of organic cation being at least (100+n) milliequivalents where n is the amount of the primary anion expressed in milliequivalents per 100 grams of clay, 100% active clay basis;

(e) continuing the reaction for a sufficient time to form a reaction product comprising organic cation-organic anion complexes which are intercalated with the smectite-type clay and the cation exchange sites of the smectite-type clay are substituted with the organic cation; and (f) recovering the reaction product wherein the mixture of said primary and secondary anions increases the ease of dispersion of said organophilic clay gellant in an organic liquid to a degree greater than a equivalent amount of either the primary or secondary anion alone.

21. The process of claim 20 wherein the organic anion mixture is obtained by sequentially adding one of said primary or secondary anions and then the other.

22. A non-aqueous fluid system which comprises a non-aqueous fluid composition and a self-activating organophilic clay rheological composition useful as an additive for non-aqueous fluid systems which comprises: the reaction product of an organic cation, a primary anion selected from the group consisting of anions derived from organic sulfonic acids, alkylsulfates and mixtures thereof, a secondary anion different from said primary anion and selected from the group consisting of anions derived from organic acids having a pK$_A$ of less than about 11.0 and mixtures thereof and a smectite-type clay having a cation exchange capacity of at least 75 milliequivalents per 100 grams of said clay such that organic cation—organic anion complexes are present which are intercalated with the smectite-type clay and the cation exchange sites of the smectite-type clay are substituted with the organic cation wherein the amount of organic cation present is at least (100+n) milliequivalents where n is the amout of the primary anion expressed in milliequivalents per 100 grams of clay, 100% clay basis wherein the combination of said primary and secondary anions increases the ease of dispersion of said organophilic clay rheological composition in an organic liquid to a degree greater than an equivalent amount of either the primary or secondary anion alone.

23. The non-aqueous fluid system of claim 22 wherein the smectite-type clay is selected from the group consisting of hectorite and sodium bentonite.

24. The non-aqueous fluid system of claim 22 wherein the amount of said organic cation is sufficient to satisfy the cation exchange capacity of the smectite-type clay and the cationic exchange capacity of the primary and secondary anions.

* * * * *